May 8, 1928.

L. C. COLE 1,668,947

DESEAMING MACHINE

Filed May 11, 1925

INVENTOR
L.C. Cole
BY
Joseph N. Schofield
ATTORNEY

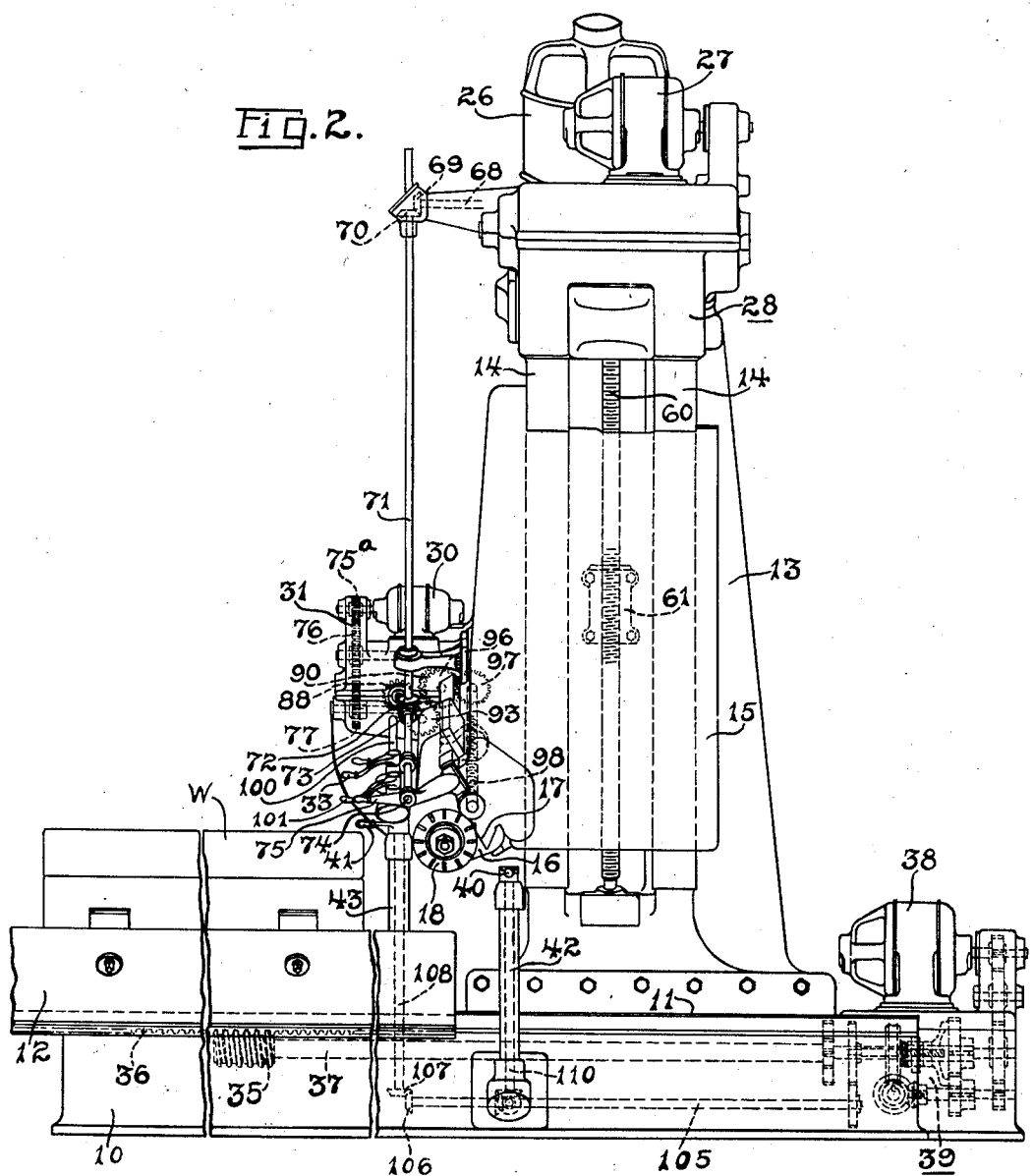

May 8, 1928. 1,668,947
L. C. COLE
DESEAMING MACHINE
Filed May 11, 1925 3 Sheets-Sheet 3
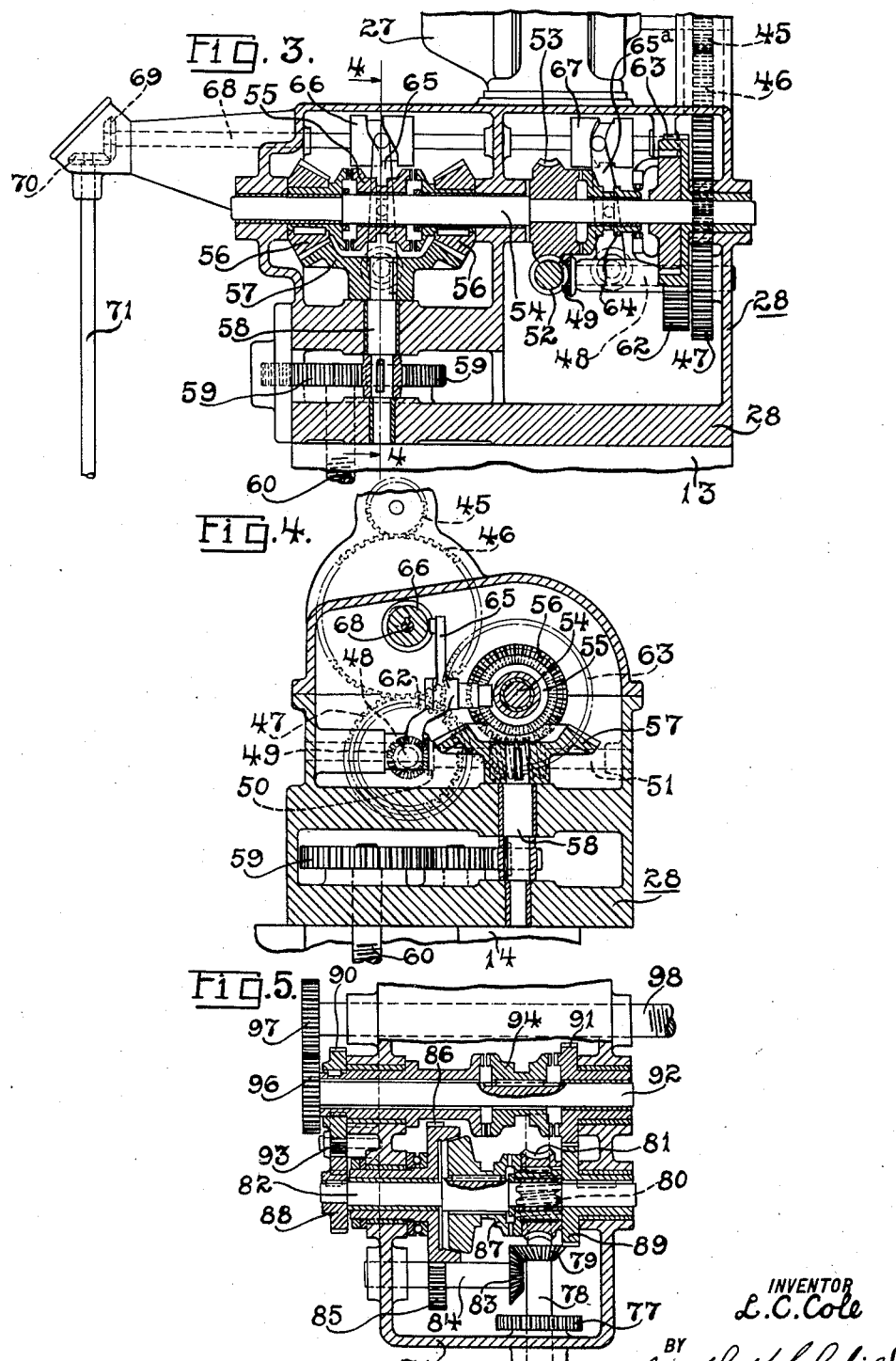

Patented May 8, 1928.

1,668,947

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

DESEAMING MACHINE.

Application filed May 11, 1925. Serial No. 29,463.

This invention relates to milling machines and in particular to an improved form of machine for milling away surface cracks in steel blooms and billets.

An object of the present invention is to provide a milling machine of the type commonly known as a "deseaming machine" which will be of improved and more efficient construction and having its motors and driving connections located for convenient actuation of the component elements and adapted to be readily controlled by an operator.

Another object of the invention is to mount the motor for driving the milling cutter upon the upper end of a column of the machine so that it may be connected conveniently through worm and worm gear with the milling cutter spindle, and so that the floor space required will be reduced to a minimum.

Another object of the invention is to mount the motor and driving connections for adjusting the position of the support carrying the milling cutter upon the upper end of the column, and to mount the motor and driving connections for reciprocating a cutter head or saddle mounted on the support directly above the work carrying table.

Another object of the invention is to mount controlling levers for the motors for adjusting the support and head directly upon the cutter saddle or head so that they will be conveniently located for an operator during operation of the machine.

A further object of the invention is to provide means for moving the support and the cutter head in either direction and at high or low speeds so that the cutter support may be raised from or lowered toward the work either slowly or at a relatively rapid rate, and so that the cutter head may be reciprocated in either direction across the work at a very low or feeding speed and at a relatively rapid traversing speed.

Another object of the invention is to provide improved controlling means for the table reciprocating motor so that the control levers may be conveniently located on opposite sides of the table and be adjacent the control levers for the adjusting motors.

More particularly an object of the present invention is to improve the construction of the deseaming machine disclosed and claimed in the patent to W. J. Hagman No. 1,545,-763, granted July 14, 1925.

With these and other objects in view, my invention consists in the features of construction and operation set forth in the following specification and illustrated in the accompanying drawings.

In the accompanying drawings annexed hereto and forming a part of this specification, I have shown my invention embodied in a deseaming machine for steel billets, but it will be understood that the invention can be otherwise embodied and that the drawings are not to be construed as defining or limiting the scope of the invention, the claims appended to the specification being relied upon for that purpose.

In the drawings:

Fig. 2 is a front elevation thereof.

Fig. 3 is a vertical sectional view of the controlling means for raising or lowering the cutter support.

Fig. 4 is a sectional view taken substantially upon line 4—4 of Fig. 3, and

Fig. 5 is a plan view in section of the mechanism for traversing the cutter saddle or head.

Figure 1:
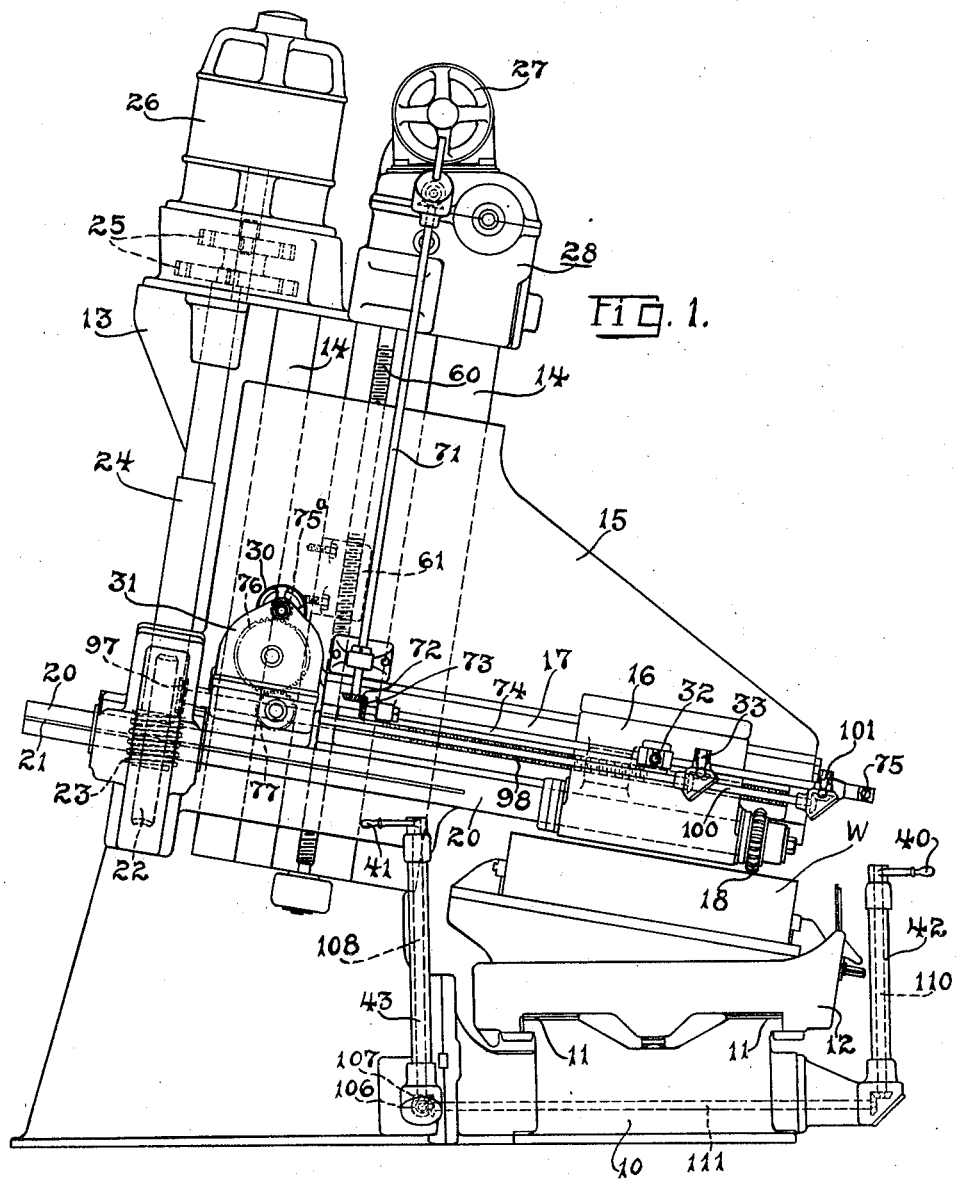
Figure 1 is an end elevation of the complete deseaming machine made in accordance with the present invention.

In the above mentioned drawings I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: first, a base; second, a column preferably fixed directly thereto; third, a work supporting table reciprocable on the base; fourth, a cutter support adjustable substantially vertically upon the column; fifth, a cutter head or saddle movable along a surface of the cutter support; sixth, a motor for reciprocating the table; seventh, a motor directly mounted upon the upper surface of the column for driving the cutter spindle and cutter; eighth, a motor and power transmission means mounted on the upper surface of the column for adjusting the position of the cutter support; ninth, a motor and power transmission means mounted on the cutter support for reciprocating the cutter and cutter spindle transversely of the table; and tenth, controlling means for the support and saddle adjusting motors mounted adjacent the table and preferably directly on the cutter head.

Referring more in detail to the figures of the drawing, I provide a base 10 having ways 11 upon its upper horizontal surface along which a work supporting table 12 may be slidably mounted. Adapted to be fixed directly to the base 10, preferably by the means shown in Fig. 1, is a column 13 standing slightly oblique and having ways 14 along its side vertical surface. Upon these ways 14 is slidably mounted a cutter support 15 on which is slidably mounted a cutter head or saddle 16. The cutter head or saddle 16, as shown in Figs. 1 and 2, slides a long ways 17 provided on the lower surface of the cutter support 15 in a direction transverse of the movement of table 12.

The table 12, as shown in Fig. 1, has its upper surface tilted in an oblique position and on this surface work W may be fastened to be operated on by the milling cutter 18. The column 13 is similarly tilted so that the saddle 16 carrying cutter 18 may be moved in a direction parallel to the upper surface of the table 12 and work W, and the support 15 carrying the saddle 16 may be moved directly toward or away therefrom.

Rotatably supported on the cutter support 15 is a cutter spindle 20 preferably splined as shown at 21 and adapted to be driven by a worm wheel 22 having a suitable key engaging spline 21. A worm 23 in mesh with this worm wheel 22 and mounted on the lower end of a telescoping shaft 24 extends upwardly and, through suitable spur gears 25, is drivingly connected to the armature of an electric motor 26. This motor 26, as shown clearly in Fig. 1, is mounted in fixed position upon the upper end surface of column 13. In order to raise and lower the cutter support 15 along the ways of the column an adjusting motor 27 and driving connections 28 are mounted adjacent the cutter driving motor 26 on the upper end surface of the column 13. These means will be described more in detail presently. In order to reciprocate the cutter head or saddle transversely along the ways 17 of the support 15, a motor 30 and power transmission means 31 are mounted directly upon the cutter support 15. These mechanisms are provided with controlling means so that they may move the cutter to any desired position and at either a rapid or slow rate. For this purpose these driving connections are provided with controlling levers 32 and 33 mounted preferably, and as shown in Fig. 1 upon the front surface of the cutter head or saddle 16.

The table 12 is adapted to be reciprocated by rotation of a worm 35 engaging a rack 36 provided on its lower surface. This worm 35 on its elongated shaft 37 may be rotated in either direction by a motor 38 mounted adjacent one end of the base 10 through suitable power transmission means 39 controlled by levers 40 and 41 conveniently located for the operator. To control this table reciprocating motor 38 from opposite sides of the table 12, the control levers 40 and 41 are mounted upon pedestals 42 and 43 preferably on opposite sides of the table 12 and adjacent the cutter saddle 16 so that the operator may control the movements of the table 12 and cutter 18 from either side of the table 12. As above stated, the machine, which is adapted particularly for deseaming operations upon steel billets, has its table 12 inclined so that the work W may be readily seen by the operator and any cutting or cooling fluid used on the work W during operation may be readily withdrawn from the point of operation of the cutter 18.

Referring to Figs. 3 and 4 the driving connections for raising and lowering the cutter support 15 are shown in detail. The armature of the cutter support operating motor 27 is provided with a pinion 45 in mesh with an intermediate gear 46. This latter gear 46 meshes with a gear 47 on a counter shaft 48 provided at its opposite end with a bevel gear 49. The bevel gear 49 engages a corresponding bevel gear 50 on a short cross shaft 51 provided with a worm 52. The worm 52 engages a worm wheel 53 on a shaft 54 extending entirely through the casing 28. This shaft 54 may therefore be rotated at relatively low speed and always in the same direction by the motor 27 through the worm 52 and worm wheel 53. On this shaft 54 is a clutch member 55 splined thereto so that it may be moved axially to engage one or the other of a pair of bevel gears 56 carrying complementary clutch members and rotatively mounted on the shaft 54. The bevel gears 56 engage a common bevel gear 57 on a short vertical shaft 58 which through suitable spur gears 59 drivingly connect the shaft with a vertical screw 60. This screw 60 extends parallelly with the column 13 and engages a nut 61 on the support 15 carrying the cutter 18 and connected parts. From the above described mechanism it will be seen that the support 15 carrying the cutter 18 can be raised or lowered relative to the work W on the table 12 at a relatively slow speed.

To rapidly rotate the screw 60 to traverse the cutter support 15 up or down means are provided to rotate the shaft 54 at a proportionately increased speed. For this purpose the short shaft 48 carries a spur gear 62 in mesh with a spur gear 63 rotatable on the shaft 54 extending through the casing. To engage the spur gear 63 drivingly with the shaft 54 a clutch member 64 is provided adapted when moved axially to engage the gear 63 while in its opposite axial position it serves to drive the shaft 54 from the worm wheel 53. The clutch for the spur gear 63 is shown as of the frictional type while that for the worm wheel 53 is of the toothed or positive type.

To actuate the clutch operating members 55 and 64 they are provided with levers 65 and 65$^a$ having outstanding pins engaging peripheral grooves cut in the operating members 55 and 64. To simultaneously move these levers 64 and 65 to control the clutch members to effect fast or slow movement of the support in either direction, cams 66 and 67 are provided mounted on a shaft 68 parallel with the driving shaft 54. These cams 66 and 67 are each provided with grooves cut into their peripheries so that rotation of the shaft 68 on which they are mounted enables the operator to actuate the clutch members 55 and 64 and to obtain the desired rotative movement of the screw 60 and vertical movement of the support 15. On the cam shaft 68 at one end is a bevel gear 69 in mesh with a bevel gear 70 at the upper end of a substantially vertical shaft 71. The lower end of the shaft is suitably and rotatably mounted on the cutter support 15 and has a bevel gear 72 meshing with another bevel gear 73 on a horizontal shaft 74 extending along the support 15. By oscillating this shaft 74 as by either of levers 32 or 75, the cams 66 and 67 are rotated and the cutter support 15 raised or lowered at either a fast or slow speed. Preferably one of the levers 75 is mounted at the free end of the cutter support 15 at the end of the controller shaft 74. Also at an intermediate point along the shaft 74 the lever 32 is mounted so that an operator standing at the left of the table 12, as viewed in Fig. 1, may readily control the position of the support 15. This lever 32 may, as shown, be mounted so that it will move back and forth with the cutter saddle or head 16.

The mechanism for reciprocating the cutter saddle 16 along the support 15 transversely of the table 12 comprises the motor 30 and transmission mechanism 31 mounted on the cutter support 15. This mechanism 31 is shown in section in Fig. 5 and is generally similar to that described above for elevating the cutter support 15. A pinion 75$^a$ on the armature shaft of the motor 30 meshes with gear 76 in mesh with gear 77 and rotates a short shaft 78 provided with a bevel gear 79 and a worm 80. The worm 80 meshes with a worm wheel 81 rotatably mounted on a second shaft 82. The bevel gear 79 meshes with another bevel gear 83 on a short shaft 84 having a spur gear 85 meshing with another gear 86 rotatably mounted on the driving or second shaft 82. Between the spur gear 86 and the worm wheel 81 is a clutch member 87 adapted to engage and be driven by either the spur gear 86 or worm wheel 81. This clutch member 87 is splined to its shaft 82. Also keyed to the shaft 82 are spur gears 88 and 89 in mesh with other gears 90 and 91 to drive an intermediate shaft 92. Gear 89 directly engages gear 91 rotatably mounted on the intermediate shaft 92 and gear 88 drives gear 90 on the intermediate shaft through an intermediate or idler gear 93. A clutch member 94 on this intermediate shaft 92 is splined thereto so that this shaft 92 may be rotated from either of the gears 90 or 91 on the driving shaft 92. As the gears 90 and 91 are rotated in opposite directions the direction of rotation of the shaft 92 depends upon which spur gear is clutched to the operating member. At the end of this intermediate shaft 92 is a gear 96 meshing with a gear 97 on the screw 98. From the above it will be seen that the screw 98 which engages a nut 99 on the saddle 16 may be rotated in either direction at a high or low speed to reciprocate the cutter saddle 16. To control the clutch members 87 and 94, cams (not shown) may be provided similar in every way to those for actuating the clutches in the support elevating mechanism 28 so that a description is not thought to be necessary. Rotation of the cams and cam shaft may be accomplished by rotation of a shaft 100 extending along the cutter support 15 by means of levers 33 and 101 connected to this shaft 100 by suitable bevel gears. Preferably one of the levers 101 is mounted at the extreme end of the cutter support 15 and the other lever 33 is mounted so that it is movable with the cutter saddle or head 16.

The table reciprocating motor 38 is connected to its worm shaft 37 for reciprocating the table 12 through change speed mechanism 39 which may be in every way similar to that disclosed in the patent to W. J. Hagman above referred to. To control the mechanism its clutches may be operated by rotation of a controller shaft 105 similar to that in the Hagman patent. As shown, this controller shaft 105 is provided with a bevel gear 106 meshing with a corresponding bevel gear 107 on a vertical shaft 108 having the lever 41 at its upper end. Preferably this vertical shaft 108 is enclosed within the pedestal 43 adjacent the table 12. A second controller lever 40 is preferably provided on the opposite side of the table 12 also in a pedestal, as shown at 42, this lever 40 on its shaft 110 may be connected to the controller shaft 105 by means of a transverse intermediate shaft 111 connected to the controller shaft 105 and lever shaft 108 by suitable bevel gears.

What I claim is:

1. A milling machine comprising in combination, a base, a work table thereon, a column fixed to said base, a cutter support adjustable vertically on said column, a rotatable cutter spindle on said support movable laterally over said table, a motor on said column for rotating said cutter spindle, a motor and power transmitting means on said column for adjusting the cutter support, a motor and power transmitting means on said cutter support for moving the cutter spindle, and levers adjacent the table for mechanically controlling the power transmitting means for the support adjusting motor and the spindle moving motor.

2. A milling machine comprising in combination, a base, a work table thereon, a column fixed to the base, a cutter support adjustable thereon, a cutter head laterally movable relative to said support and carrying a rotatable milling cutter, a rotatable spindle for driving said cutter, a motor on said column for rotating said spindle, a motor on said column for adjusting said support, a motor on said support for adjusting said cutter head, and means on said cutter head for controlling the cutter support and cutter head adjusting motors.

3. A milling machine comprising in combination, a base, a work table thereon, a column fixed to the base, a cutter support adjustable thereon, a cutter head laterally movable relative to said support and carrying a rotatable milling cutter, a rotatable spindle for driving said cutter, a motor on said column for rotating said spindle, a motor on said column for adjusting said support, a motor on said support for adjusting said cutter head, and levers on said cutter head for mechanically controlling the cutter support and cutter head adjusting means.

4. A milling machine comprising in combination, a base, a work table thereon, a column fixed to the base, a cutter support adjustable thereon, a cutter head laterally movable relative to said support and carrying a rotatable milling cutter, a rotatable spindle for driving said cutter, a motor on said column for rotating said spindle, a motor and power transmission means on said column for adjusting said support, a motor and power transmission means on said support for adjusting said cutter head, and levers on said cutter head for controlling power transmitting means for the cutter support and cutter head adjusting motors.

5. A milling machine comprising in combination, a base, a work table thereon, means to reciprocate the table, a column, a cutter support adjustable thereon, a cutter head on said support and movable laterally relative to said table, a cutter spindle having a milling cutter thereon, a motor on said column for rotating said spindle and cutter, a motor on the column for adjusting said cutter support, a motor on the cutter support for adjusting the cutter head and cutter, and means adjacent the table for controlling the motors for adjusting the cutter support, the cutter head and the means for moving the table.

6. A milling machine comprising in combination, a base, a work table thereon, a motor to reciprocate the table, a column, a cutter support adjustable thereon, a cutter head on said support and movable laterally relative to said table, a cutter spindle having a milling cutter thereon, a motor on said column for rotating said spindle and cutter, a motor and power transmitting means on the column for adjusting said cutter support, a motor and power transmitting means on the cutter support for adjusting the cutter head and cutter, and means adjacent the table for controlling the power transmitting means for adjusting the cutter support, the cutter head and for moving the table.

7. A milling machine comprising in combination, a base, a work table thereon, a motor to reciprocate the table, a column, a cutter support adjustable thereon, a cutter head on said support and movable laterally relative to said table, a cutter spindle having a milling cutter thereon, a motor on said column for rotating said spindle and cutter, a motor on the column for adjusting said cutter support, a motor on the cutter support for adjusting the cutter head and cutter, separate power transmitting means for each of said motors, and levers adjacent the table for mechanically controlling the power transmitting means for the motors for adjusting the cutter support, the cutter head and for moving the table.

8. A milling machine comprising in combination, a base, a work table thereon, a column fixed to said base, a cutter support on said column and having a rotatable cutter mounted therein, a motor on said column for adjusting said support, a power transmission means coupled to said motor and adapted to rotate a screw engaging said support, clutches in said transmission means, levers for operating said clutches to rotate said screw in either direction and at a high or low speed, and cams rotatably mounted to actuate said clutch operating lever.

9. A milling machine comprising in combination, a base, a work table thereon, a column fixed to said base, a cutter support on said column and having a rotatable cutter mounted therein, a motor on said column for adjusting said support, a power transmission means coupled to said motor and adapted to rotate a screw engaging said support, clutches in said transmission means, levers for operating said clutches to rotate said screw in either direction and at a high or low speed, cams rotatably mounted to actuate said clutch operating levers, and means to simultaneously rotate said cams to operate said clutches.

10. A milling machine comprising in combination, a base, a work table thereon, a column fixed to said base, a cutter support on said column and having a rotatable cutter mounted therein, a motor on said column for adjusting said support, a power transmission means coupled to said motor and adapted to rotate a screw engaging said support, clutches in said transmission means, levers for operating said clutches to rotate said screw in either direction and at a high or low speed, cams rotatably mounted to actuate said clutch operating levers, and controlling levers adjacent said cutter connected to said cams whereby said cams may be simultaneously rotated to operate said clutches.

In testimony whereof, I hereto affix my signature.

LYNDON C. COLE.